(12) United States Patent
Tonn

(10) Patent No.: US 10,933,566 B2
(45) Date of Patent: Mar. 2, 2021

(54) METHOD AND DEVICE FOR DETERMINING WHETHER OR NOT A SINGLE USE MOLD IS ACCEPTABLE

(71) Applicant: Novartis AG, Basel (CH)

(72) Inventor: Thomas Tonn, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 123 days.

(21) Appl. No.: 16/110,290

(22) Filed: Aug. 23, 2018

(65) Prior Publication Data

US 2019/0134859 A1 May 9, 2019

Related U.S. Application Data

(60) Provisional application No. 62/549,629, filed on Aug. 24, 2017.

(51) Int. Cl.
| | | |
|---|---|---|
| *B29D 11/00* | (2006.01) | |
| *B29C 33/70* | (2006.01) | |
| *G01B 11/06* | (2006.01) | |
| *G01B 11/14* | (2006.01) | |
| *G01B 11/24* | (2006.01) | |

(52) U.S. Cl.
CPC ........ *B29C 33/70* (2013.01); *B29D 11/00038* (2013.01); *B29D 11/0048* (2013.01); *B29D 11/00951* (2013.01); *G01B 11/06* (2013.01); *G01B 11/0675* (2013.01); *G01B 11/14* (2013.01); *G01B 11/2441* (2013.01); *B29C 2033/705* (2013.01)

(58) Field of Classification Search
CPC .......... B29D 11/00038; B29D 11/0048; B29D 11/00951; B29C 33/70
See application file for complete search history.

(56) References Cited

U.S. PATENT DOCUMENTS

| | | |
|---|---|---|
| 6,428,301 B1 | 8/2002 | Fukuma et al. |
| 2005/0264756 A1 | 12/2005 | Esch |
| 2006/0176491 A1 | 8/2006 | Hall |
| 2007/0002331 A1* | 1/2007 | Hall .................. B29D 11/0098 356/503 |
| 2008/0007694 A1 | 1/2008 | Wei et al. |
| 2009/0262333 A1 | 10/2009 | Hall |

(Continued)

*Primary Examiner* — Mathieu D Vargot
(74) *Attorney, Agent, or Firm* — Patrick M. Ryan

(57) ABSTRACT

A method for determining whether or not a single use mold is acceptable, comprises
  providing a closed lens mold (1) comprising two lens mold halves, and having a first and a second optical lens molding surface forming a molding cavity (15) and defining a molding cavity thickness therebetween,
  providing at least one interferometer (3), each having at least one thickness measurement beam (31),
  providing a lens mold holder (2),
  positioning the lens mold (1) such that the thickness measurement beam (31) of the interferometer (3) impinges on the lens mold (1) for measurement of the distance between the two molding surfaces surrounding the molding cavity (15),
  measuring the thickness profile of the molding cavity (15) with the interferometer (3) on at least three positions of the molding cavity (15) of the lens mold (1),
  comparing the measured thickness profile with a predetermined thickness profile to determine whether or not the lens mold (1) is acceptable.

1 Claim, 5 Drawing Sheets

(56) References Cited

U.S. PATENT DOCUMENTS

| | | |
|---|---|---|
| 2014/0072665 A1 | 3/2014 | Biel et al. |
| 2014/0078513 A1 | 3/2014 | Freimann et al. |
| 2016/0047712 A1 | 2/2016 | Colonna de Lega et al. |
| 2016/0061689 A1 | 3/2016 | Morley et al. |

* cited by examiner

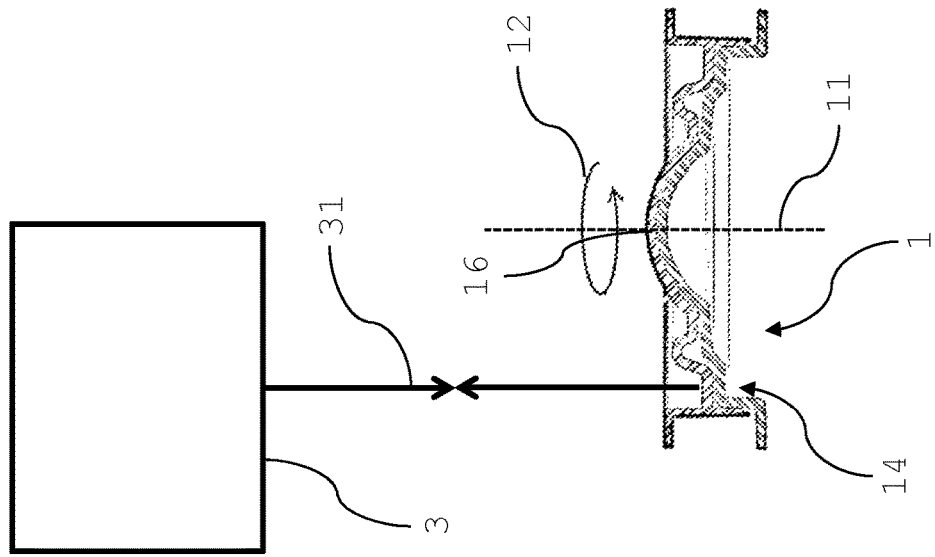
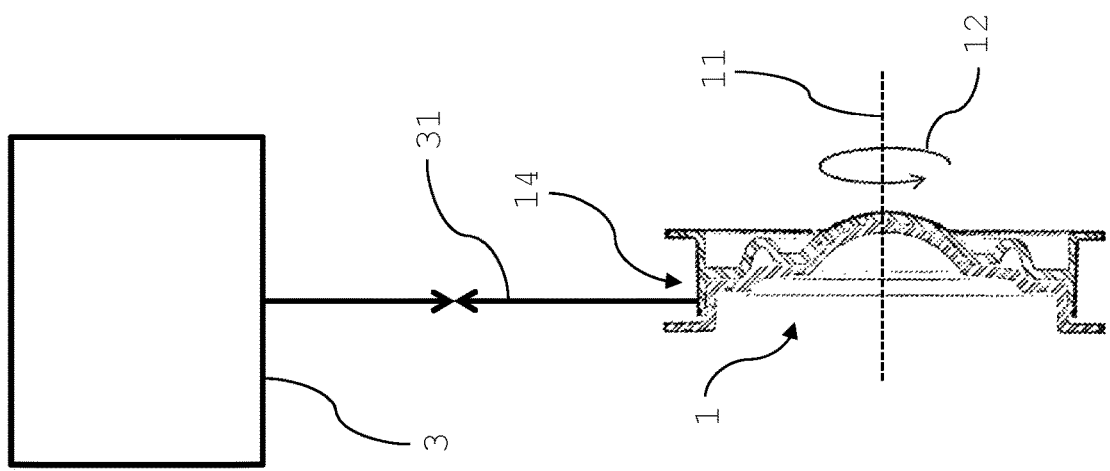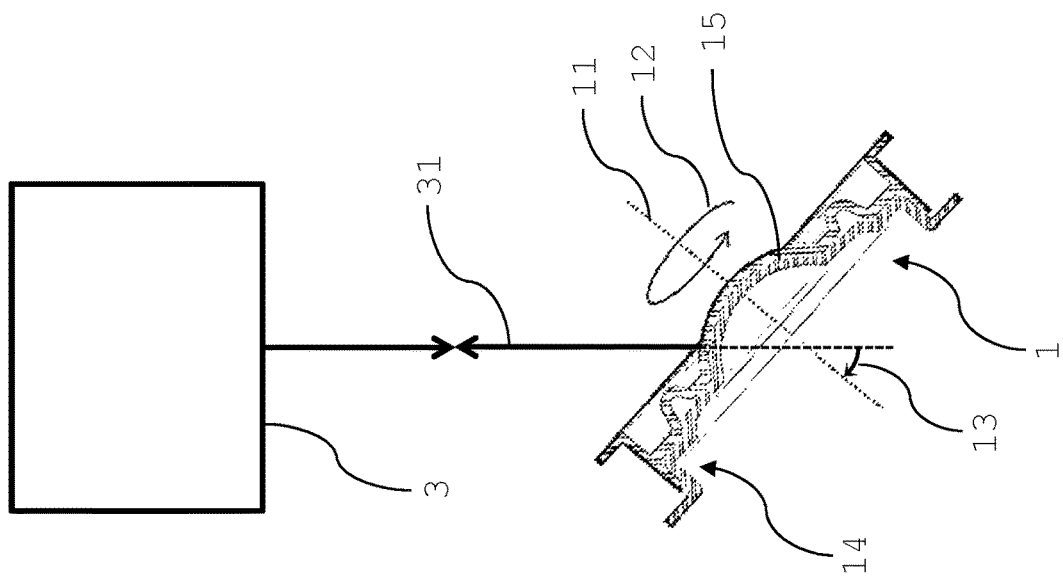

METHOD AND DEVICE FOR DETERMINING WHETHER OR NOT A SINGLE USE MOLD IS ACCEPTABLE

This application claims the benefits under 35 USC 119(e) of U.S. provisional application Ser. No. 62/549,629 filed on Aug. 24, 2017, incorporated herein by reference in its entirety.

This invention relates to a method and apparatus for determining whether or not a single use mold, in particular for forming soft contact lenses, in particular soft toric contact lenses, is acceptable. In particular, the present invention uses fiber optic interferometry to measure the thickness profile of a molding cavity of the single use mold.

BACKGROUND

Ophthalmic lenses may be created using a variety of methods, one of which includes molding using single-use lens molds. In this molding process, the lenses are manufactured between two mold halves without subsequent machining of the surfaces or edges. As such, the geometry of the lens is determined by the geometry of the lens mold having a first and a second optical lens molding surface forming a lens mold cavity in the assembled, closed mold. The process of the lens production generally involves dispensing a liquid crosslinkable and/or polymerizable material into a female mold half, mating a male mold half to the female mold half, heating and/or irradiating to crosslink and/or polymerize, separating the mold halves and removing the lens and packaging the lens.

Typical molds may be spherical or non-spherical, depending upon the type of lens to be created. Because most molds have one or more arcuate surfaces, linear coordinates may be unable to measure a curved surface accurately or may only be able to accurately measure portions of the mold geometry. Therefore, once a mold is designed and fabricated it must be measured to ensure that it meets the proper specifications. After validation of the mold design, the fabricated single use molds have to be checked at least on a random basis whether they meet the proper specifications.

SUMMARY OF THE INVENTION

The present invention suggests a method and a device as it is specified by the features of the independent claim. Advantageous aspects of the device according to the invention are the subject matter of the dependent claims.

Throughout the entire specification, whenever the term "mold" or "lens mold" is used this term is to be understood to also denote only a part of an entire lens mold such as, for example, a mold half. Also, as used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

The present invention suggests a method and an apparatus for determining whether or not a single use mold is acceptable.

In particular, the present invention suggests a method for determining whether or not a single use mold, in particular for forming soft contact lenses, in particular soft toric contact lenses, is acceptable, the method comprising the steps of:
  providing a closed lens mold comprising two lens mold halves, and having a first and a second optical lens molding surface forming a molding cavity and defining a molding cavity thickness therebetween,
  providing at least one interferometer, each having at least one thickness measurement beam,
  providing a lens mold holder,
  positioning the lens mold such that the at least one thickness measurement beam of the at least one interferometer impinges on the lens mold for measurement of the distance between the two molding surfaces surrounding the molding cavity,
  measuring the thickness profile of the molding cavity with the interferometer on at least three positions of the molding cavity of the lens mold,
  comparing the measured thickness profile with a predetermined thickness profile to determine whether or not the lens mold is acceptable In some embodiments of the present invention, the step of measuring the thickness profile is performed by measuring the thickness profile of the molding cavity with the interferometer on at least three positions arranged along at least one measurement circle being extending concentrically about an optical axis of the lens mold.

In some other embodiments of the method according to the invention, the step of measuring the thickness profile with the interferometer on at least three positions of the molding cavity of the lens mold, is performed with the thickness measurement beam impinging on the lens mold at an angle of from 40° to 70°, particularly from 45° to 65°, very particularly from 50° to 60° with respect to an optical axis of the lens mold.

In some other embodiments of the method according to the invention, the step of providing a lens mold holder comprises providing a lens mold holder configured to hold a lens mold in a manner such that the lens mold is rotatable about an optical axis of the lens mold, the rotational axis coinciding with the optical axis and being particularly arranged normal to a tangential plane to the lens molding surfaces at the apex of the molding surfaces, and the step of measuring the thickness profile is performed by rotating the lens mold about the optical axis of the lens mold for at least 60°, particularly at least 120°, very particularly at least 180°, the thickness measurement beam impinging on the lens mold along the measurement circle during rotation of the lens mold. In a particular embodiment, the rotation of the lens mold about the optical axis is performed up to 360°.

In some further embodiments of the method according to the invention, the step of measuring the thickness of the molding cavity with the interferometer is performed by impingement of the thickness measurement beam onto the lens mold, the thickness measurement beam impinging within a range of up to 5° relative to the normal to the tangential plane to the optical surface at the impact point of the thickness measurement beam.

In still some further embodiments of the invention, the step of providing a lens mold holder comprises providing a lens mold holder configured to allow tilting of the lens mold about a tilting axis normal to the thickness measurement beam of the interferometer impinging on the lens mold and wherein the step of positioning the lens mold such that the thickness measurement beam of the interferometer impinges on the lens mold comprises by tilting the lens mold.

In still some further embodiments of the method according to the invention, the step of providing at least one interferometer comprises providing a multi-channel interferometer having at least three thickness measurement beams, and wherein the step of measuring the thickness profile of the molding cavity with the interferometer on at least three positions of the molding cavity is performed with the at least three thickness measurement beams. In particular, the at least three positions of the molding cavity are arranged along one measurement circle concentric with the optical axis of the lens mold.

In some specific embodiments of the method according to the invention, the thickness of the molding cavity at the apex of the lens mold is measured additionally to the measurement of the thickness profile.

In still some further embodiments of the method according to the invention, the method further comprises a step of measuring a thickness profile of the optical surface wall of the lens mold.

In still some further embodiments of the invention, the mold halves of the lens mold comprise engagement portions radially surrounding the molding surfaces and having radially engaging walls, and the method further comprises a step of measuring a radial adjustment gap between the radially engaging walls of the engagement portions by impingement of the thickness measurement beam on the radially engaging walls.

In some specific embodiments of the method according to the invention, uncured lens forming material is provided into the lens mold.

In some further embodiments of the method according to the invention, air is provided in the molding cavity of the closed lens mold.

In still some further embodiments of the invention, cured lens forming material is provided in the molding cavity of the closed lens mold.

A further aspect of the invention is directed to a device for determining whether or not a single use mold, in particular for forming soft contact lenses, in particular soft toric contact lenses, is acceptable, the device comprising:
a lens mold holder for holding the closed lens mold having two molding surfaces forming a molding cavity,
at least one interferometer configured to measure the distance between two optical molding surfaces forming a molding cavity of the closed lens mold,
an electronic evaluation unit configured to determine the distance between the two molding surfaces of the molding cavity from the interference fringes generated by said interferometer, thereby determining a thickness profile of the molding cavity, the electronic evaluation unit being further configured to compare the measured thickness profile with a predetermined thickness profile to determine whether or not the lens mold is acceptable.

In a specific embodiment of the device according to the invention, the lens mold holder is configured to rotate the lens mold about an optical axis of the lens mold.

In another specific embodiment of the device according to the invention, the lens mold holder is configured to tilt the lens mold about a tilting axis normal to the thickness measurement beam of the interferometer impinging on the lens mold.

The present invention includes a method for determining the thickness profile of a closed lens mold, wherein male and female mold halves are mated, which closed lens mold has one or more boundaries that reflect light using an interferometer. An interferometer is a measurement instrument that utilizes optical interference to determine various characteristics of optical surfaces. Interferometers typically generate a light beam, such as that of a laser, and split it using a beam splitter. The resulting two light beams include a sample light beam, in particular a thickness measurement beam, and a reference light beam. These light beams are passed through a lens mold and a reference optical system, respectively, to create interference fringes which may then be measured. Methods for measuring the thickness of a material using interferometers are known in the prior art. In the present invention the interferometer may be a fiber-optic interferometer.

By positioning the contact lens such that the thickness measurement beam is incident upon the sample, measurements of the contact lens thickness are obtained as generated by interference fringes created by the interferometer. Said interference fringes are generated by light reflecting off of the boundaries between two different phases. In particular, the interference fringes are generated by the light reflection between a phase surrounding the lens mold and the outer surface of a female mold half, between the inner surface of the female mold half and the medium in the molding cavity, in particular air, lens forming material or cured lens forming material, the medium in the molding cavity and the inner surface of a male mold half, and the outer surface of the male mold half and said phase surrounding the lens mold. The inner surface of the respective mold half is the surface facing the molding cavity of the lens mold, whereas the outer surface of the lens mold is the surface not facing the molding cavity. The interference fringes generated by the boundaries between the inner surface of the female mold half and the medium in the molding cavity, the medium in the molding cavity and the inner surface of a male mold half are then analyzed The analysis of the interference fringes includes calculating distance between the molding surfaces surrounding the molding cavity using optical path and group index as known in the art. The measurement of the distance between the molding surfaces resulting by the reflections at their boundaries with the medium in the molding cavity allows for evaluation of the thickness profile of the molding cavity, in particular by converting an optical path distance to molding cavity thickness.

The evaluation of the thickness profile of the molding cavity allows to determine whether or not the lens mold is acceptable by comparing the thickness profile measured to an expected and therefore predetermined thickness profile. This predetermined thickness profile may be a model which may be provided in the electronic evaluation unit for comparison to and/or correlation with the measured thickness profile. The degree of correlation may be expressed with a parameter of deviation between the measured thickness profile and the predetermined thickness profile, the parameter of deviation being an indication of the acceptability of the thickness profile when the parameter of deviation passes a predetermined threshold value.

The above-described system measures the optical path. To convert the optical path distance to actual material thickness, the measured optical path distance must be divided by the group index or group velocity of the material in consideration of the shape of the mold surface, which may be concave or convex, a calibration leading to an offset value for the calculation. The group index is a material property, is related to the refractive index as known in the art. The difference in group index between materials allows for the interferometer to detect the reflection. In an embodiment in which a lens forming material is present inside of the closed mold, the lens forming material would have a different group index than the polypropylene mold halves. Same applies for an empty closed mold, in which a gas, in particular air, is present inside of the closed mold, the gas would have a different group index than the polypropylene mold halves.

The light used by the interferometer may be visible, UV, IR, or any other wavelength of radiation that will reflect off the surfaces of interest. Due to the small tolerance on the angle of reflectance, the molding surfaces are preferably substantially normal (about 5 degrees from perpendicular) relative to the thickness measurement beam, for example from a light emitting probe of a fiber optic interferometer, to pick up the measurement signal from the light reflected. The probe may act as a lens focusing system that shapes the light from the fiber optic interferometer into a useful form. Additionally, the optics of the interferometer probe will preferably determine the distance of the lens mold from the light-emitting aperture on the interferometer probe. For example, if points other than those located near the center are to be scanned, the sample or the interferometer probe is preferably moved in a way that keeps the orientation of the interferometer probe and sample constant to within the tolerance of the instrument. Changes in the thickness profile of the sample may further reduce the acceptable angle to receive a signal.

During measurement of the thickness profile of the molding cavity, it may be preferable to have a substantially constant distance between the sensor and the surfaces surrounding the molding cavity.

This method allows for non-destructive determination, whether the single-use lens mold conforms to the specification for the lens to be manufactured. This method may be used offline or inline for the evaluation of the lens molds. The method allows for the evaluation of the closed lens mold comprising air in its molding cavity before using the lens mold for the manufacture of a series of lenses. In particular, the manufacture of a lens taking long time from the dosing of the lens forming material into the molding cavity of the lens mold to the cured lens, this method allows for simple and efficient determination, whether the lot of lens molds conforms to the specification at a very early stage of the manufacture process without having to form in a laborious manufacture process sample contact lenses to be evaluated. The method additionally allows for a drastic shortening of the process development time, as the measurement may be performed without having to first produce sample lenses. Additionally, the method allows for the determination, whether the two mold halves mate incorrectly, for example due to out of center mold mating or incomplete closing.

In particular, thickness profile may be correlated to a model of the expected thickness profile which corresponds to the expected geometry of the molding cavity. A threshold value for the correlation value of the measured thickness profile to the expected thickness profile may be used for the automated determination whether the lens mold is acceptable or not.

A closed mold is a mold assembly in which two mold halves are mated to form a molding cavity between the molding surfaces of the two mold halves.

The method is also suitable for measuring closed lens molds comprising a lens forming material or even a cured lens in their molding cavity, which may be of particular interest in an inline method for inspecting the lens molds used for forming the lenses.

The lenses may be made from polymethyl methacrylate, polyvinyl alcohol, silicone hydrogel or other suitable polymers. The lens molds are made from a polymer sufficiently transparent for allowing the thickness measurement beam to traverse the lens mold. For example, the lens mold may be made of a suitable polymer such as from a family of thermoplastics, such as polystyrene, polycarbonate, poly [4-methyl-pentene 1] (TPX), polyvinyl chloride (PVC), polyethylene, polypropylene, copolymers of styrene with acrylonitrile or butadiene, acrylates such as polymethyl methacrylate, polyacrylonitrile, polyamides, polyesters, etc. in particular polyethylene or polypropylene.

The present method is particularly advantageous when determining whether the single-use lens mold is an aspherical lens mold for manufacturing toric contact lenses comprising a ballast in form of an increased lens thickness or a slab-off. The method allows for evaluation of the geometry of the toric contact lens by evaluating whether the thickness profile of the closed lens mold corresponds to the expected thickness profile for the toric contact lens, in particular the position and the thickness of the ballast underlying strict specifications. It has been shown that the medium in the molding cavity has only reduced influence on the molding cavity geometry, hence the measurement may be performed either with air in the molding cavity, or a lens forming material. The thickness profile measured with the method according to the invention correlates with the thickness profile of a toric contact lens produced by curing a lens forming material in the cavity of such lens mold.

The geometry of the expected thickness profile of such lens mold for a toric contact lens being known, in particular along the measurement circle, the thickness profile may be approximated by a three-point measurement, for example by correlating the measurement values with a model of the molding cavity geometry. Of course, the more measurement points, the better the approximation of the thickness profile and the better the determination whether the thickness profile corresponds to the specifications. The evaluation of the thickness profile is enhanced when the measurement of the thickness profile is performed on at least three positions arranged along a measurement circle being concentric with an optical axis of the lens mold, the at least one measurement circle not coinciding with the optical axis.

The thickness measurement beam impinging on the lens mold at a specific angle with respect to the optical axis of the lens mold is particularly advantageous for maintaining the thickness measurement beam substantially normal to the molding surface of the lens mold. In general, each molding surface's axis nominally lies on a common axis—the optical axis—of the assembly of the closed lens mold.

In one embodiment, at least three interferometer probe heads are provided to measure at least three specific points of interest on the mold. In this embodiment one interferometer probe of a multi-channel interferometer may be used for each point of interest. This embodiment is of particular advantage when the method is used inline.

Alternatively, the step of measuring the thickness profile is performed by rotating the lens mold about the optical axis of the lens mold, the thickness measurement beam impinging on the lens mold along the measurement circle during rotation of the lens mold. This aspect of the invention allows for precise determination of the thickness profile of the molding cavity, as the lens mold is rotated by an actuator about the optical axis of the lens mold allowing for recording a multiplicity of thickness measurements.

By tilting the lens mold about a tilting axis normal to the thickness measurement beam of the interferometer impinging on the lens mold, the method allows for simple recording of measurement data along measurement circles including the measurement of the apex-to-apex thickness, the distance between the molding surface at the apex of the male mold half and the molding surface at the apex of the female mold half. The lens mold is easily brought in position for the thickness profile measurement and is particularly flexible for the use with different lens molds having different geometries.

In case of an apex-to-apex thickness measurement additionally to the thickness profile measurement, the sensor may be aligned over the center of the lens for an apex thickness measurement of the lens mold prior to tilting the lens mold for the thickness profile measurement along a measurement circle.

The step of providing a lens mold holder may comprise providing a rotatable lens mold holder configured to rotate the lens mold, having flanges surrounding the optical surfaces, around the center of the lens mold in a plane parallel to the plane formed by the flanges of the lens mold.

In particular when profile is measured along at least one circle concentric with the optical axis of the lens mold, the measurement includes the measurement of a thickness of the lens cavity between the apex of the first optical lens molding surface and the apex of the second optical lens molding surface measured along the optical axis of the lens mold (apex-to-apex thickness of the cavity).

In the measurement step of the present invention, the measurement step may include converting an optical path distance to material thickness. Converting the optical path distance may comprise measuring the optical path distance; and dividing the optical path distance by the group index of the material.

The lens measurement system may include a light source and a fiberoptic interferometer. The apparatus, similar to the method, may include a lens holder for aligning the fiber optic interferometer with the sample lens. In a related embodiment, the electronic evaluation unit may include a computer that, in conjunction with the interferometer, is capable of determining the group index of a material.

Additionally, the method according to the invention allows for the measurement of the radial adjustment gap of engaging walls of engagement portions of the lens mold. The engagement portion of each mold half, generally the flange of each mold half, is radially surrounding the molding surfaces. In particular, the thickness measurement beam may impinge on the engagement portions and measure the distance between the two radially engaging walls of corresponding engagement portions of the lens mold halves for determining the adjustment gap in the closed lens mold. In particular, the radial gap is measured at two or more positions along the engaging walls to determine a radial adjustment gap profile. Ideally, the radial adjustment gap profile is constant within a tolerance range along the radially engaging walls. For example, for an interference fit, the radial adjustment gap generally will be substantially inexistent and therefore the existence of an adjustment gap (different from 0) at least around portions of the engaging walls is a sign for an inacceptable lens mold. Hence, this method allows for estimation of the strains in case of an interference fit in the closed lens mold, for example when the radial adjustment gap profile is out of range, and again may evaluate at a very early stage whether the specifications for the lens mold are followed. The measurement of adjustment gaps may occur normal to the plane formed by the engagement portion (planar adjustment gap), in particular the flanges of the lens mold or radially to the lens mold (radial adjustment gap), from the outer radial edge of the engagement portion towards the optical axis of the lens mold.

An interference-fit is a fastening between the two mold halves which is achieved by friction between the two mold halves, generally by friction between the engagement portions or flanges of both mold halves. An interference-fit between the two mold halves is generally obtained by designing the external dimension of the portion of one mold half engaging the second mold half which slightly exceeds the internal dimension of the engagement portion of the second mold half.

The engagement portions of the respective mold halves may also form-fit. Such form-fit is intended for accurate positioning of the two mold halves forming the closed lens mold without friction between the engaging portions. Form-fitting mold halves generally assemble with slight play.

The design of the fitting of the engagement portions plays a key role in maintaining the desired geometry while assembling the two corresponding mold halves for forming the closed lens mold.

When the electronic evaluation unit is configured for comparing the measured thickness profile with a predetermined thickness profile to determine whether or not the lens mold is acceptable, an automated inline determination is facilitated.

In the device, the lens mold holder is particularly configured to rotatably hold a lens mold, allowing to rotate the lens mold about an optical axis of the lens mold, the optical axis being particularly normal to the tangential plane to the optical lens molding surface at the apex. In particular, the device comprises an actuator being configured to rotate the lens mold relative to an optical axis of the lens mold.

Advantages were already described for the method for determining whether or not a single use mold is acceptable and apply to the device for determining whether or not a single use mold is acceptable in an analogous way.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

Further embodiments and advantages become apparent from the following description of detailed embodiments of the method and device according to the invention with the aid of the drawings.

BRIEF DESCRIPTION OF THE DRAWINGS

FIG. 3 shows a method for measuring a thickness profile of the molding cavity of the lens mold with a single-channel interferometer.

FIG. 4a shows a method for measuring a thickness of the radial adjustment gap of the lens mold with a single-channel interferometer.

FIG. 4b shows a method for measuring a thickness of the planar adjustment gap of the lens mold with a single-channel interferometer.

DETAILED DESCRIPTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. In particular, the terms male mold and male mold half may be used interchangeably. The terms female mold and female mold half may also be used interchangeably. Additionally the term "sample" refers to a mold sample. It is to be understood by one of ordinary skill in the art that the present discussion is a description of exemplary embodiments only, and is not intended as limiting the broader aspects of the present invention.

Figure 1:
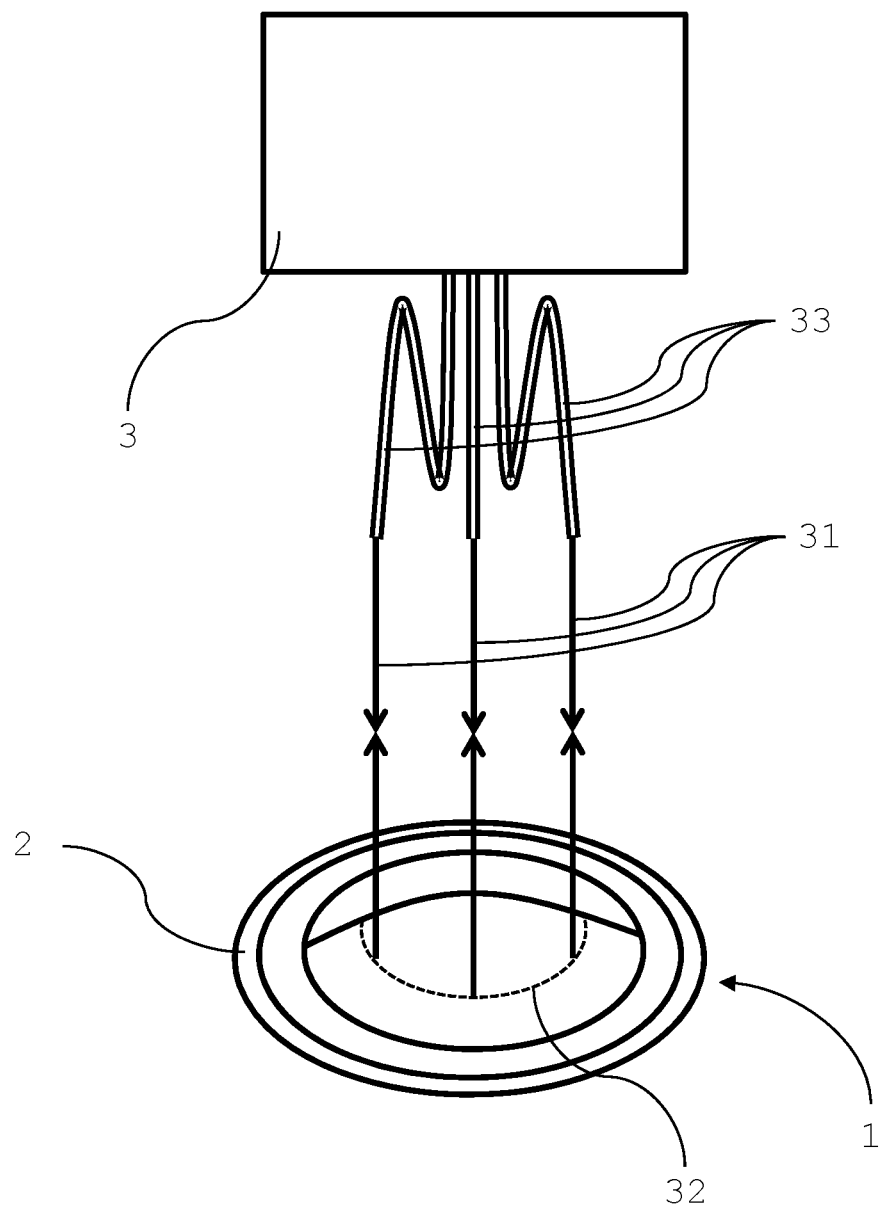
FIG. 1 shows a set-up for measuring a thickness profile of the molding cavity of the lens mold with a multi-channel fiber optic interferometer according to the invention.

FIG. 1 shows a schematic set-up for measuring a thickness profile of the molding cavity 15 of the lens mold 1 with a three-channel fiber optic interferometer 3 having three optical fibers 33. The three thickness measurement beams 31 emanating from each of the three optical fibers 33 are directed to three different positions on the lens mold 1. The thickness measurement positions on the lens mold are preferably located on a measurement circle 32 which is concentric with the optical axis of the lens mold 1. The lens mold 1 is arranged on a lens mold holder 2 for precise positioning of the lens mold 1. The three channel interferometer 3 receives light reflected off the different boundaries of the lens mold which generate interference fringes. The interference fringes may be analyzed by fast Fourier transform, for example, for determination of the distance from the molding surface of the male mold to the molding surface of the female mold. At least three measurement positions allow for approximation of the thickness profile of the lens mold 1 based on the expected thickness profile of a molding cavity 15 (shown in FIG. 3) for a toric lens, for example. The measurement values may be correlated to a model of the expected thickness profile which corresponds to the expected geometry of the molding cavity. The higher the number of measurement positions, the better the approximation may be correlated to the thickness profile of the molding cavity 15.

Figure 2A:
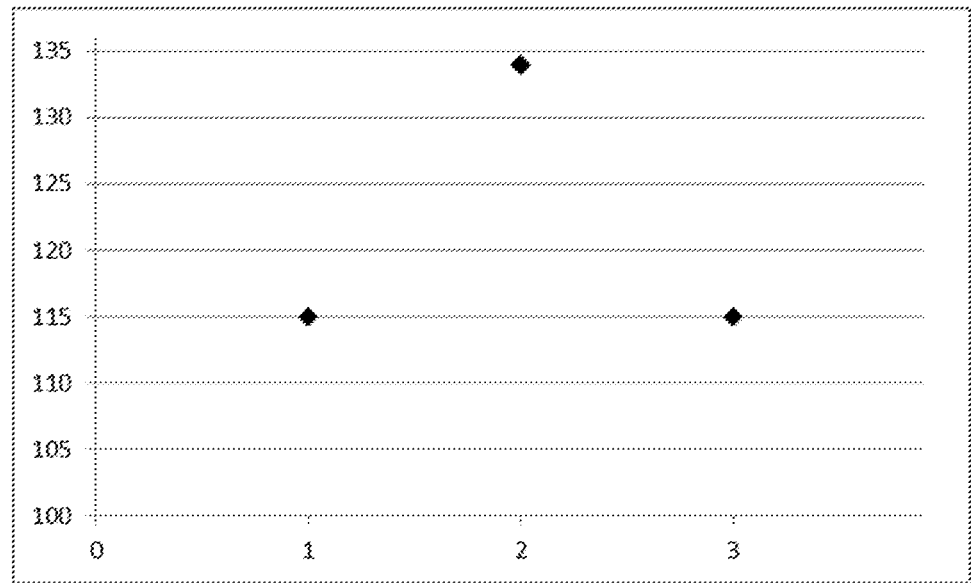
FIG. 2a is a representation of a thickness profile determined by the method according to FIG. 1.
Figure 2B:
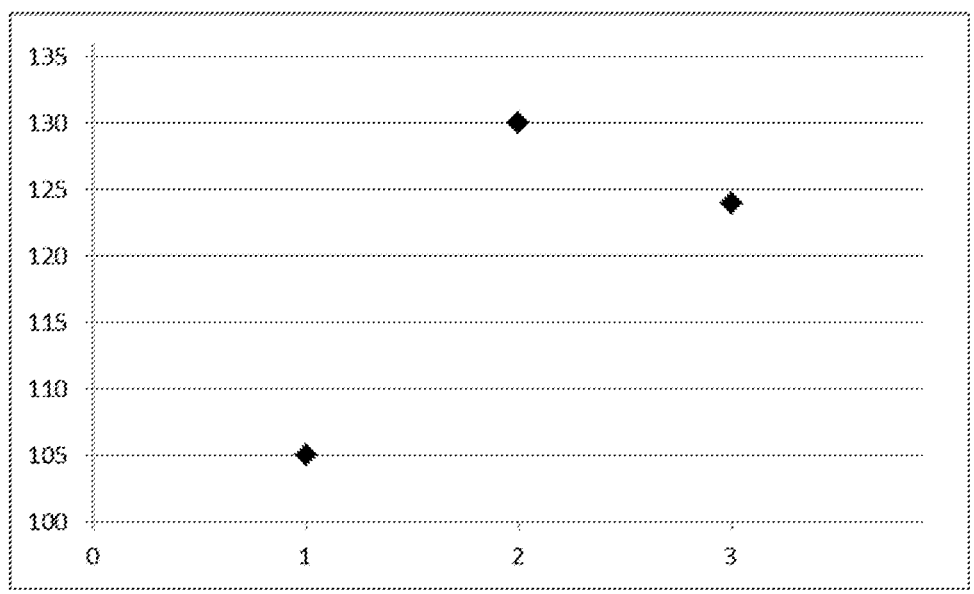
FIG. 2b is another representation of a thickness profile determined by the method according to FIG. 1.

FIG. 2a and FIG. 2b represent the values for three measurement points of the three thickness measurement beams (numerals 1, 2 and 3 in the representations FIGS. 2a, 2b) of the set-up shown in FIG. 1.

In the representation shown in FIG. 2a, the second measurement position is arranged at the maximum of the molding cavity thickness, in other words at a position where the ballast prism has the highest thickness on the measurement circle 32. The first and third measurement positions are located at equal distance on both sides of the second measurement position. Hence, the measured thickness values shown in FIG. 2a are symmetrical and allow an easy approximation of the thickness profile of the molding cavity.

A second representation of the measurement points is shown in FIG. 2b. In this representation, the lens mold is rotated by about 45°, the second measurement position not coinciding any more with the maximum of the molding cavity thickness. The measurement values for the first and third positions are not symmetrically located around the measurement value for the second position. However, knowing the expected geometry of the molding cavity, the thickness profile may be approximated using these three values with precision acceptable for an inline thickness profile determination, for example.

FIG. 3 shows a measurement method for determining the thickness profile along a measurement circle by rotation 12 of the lens mold about its optical axis 11 with the use of a single channel interferometer 3. The thickness measurement beam 31 from the interferometer 3 impinges on the lens mold 1 at an angle 13 of 50° with respect to the optical axis 11 of the lens mold 1. Measuring the thickness profile is performed by rotating the lens mold 1 about the optical axis 11 of the lens mold 1. Due to the rotation 12 about the optical axis 11 of the lens mold 1, the thickness measurement beam 31 impinges on the lens mold 1 along the measurement circle during thickness measurement. In this embodiment, the thickness measurement beam 31 impinges onto the mold half in a direction normal to the tangential plane to the optical surface of the lens mold at the impact point of the thickness measurement beam 31.

FIGS. 4a and 4b show the measurement of adjustment gaps of engagement portions 14 of the lens mold 1, the engagement portion 14 of each mold half being radially surrounding the molding surfaces. To this purpose, thickness measurement beam 31 impinges on the engagement portion 14 and measures the distance between two engaging walls of corresponding engagement portions 14 of the lens mold halves forming the closed lens mold 1. In FIG. 4a, a radial adjustment gap profile is determined around the circumference of the lens mold 1, whereas in FIG. 4b, a thickness profile of the planar adjustment gap of the lens mold. The measurement of the radial adjustment gap is performed with the thickness measurement beam impinging onto the radial edge of the lens mold, particularly normal to the optical axis of the lens mold. The measurement of the planar adjustment gap occurs normal to the plane formed by the engagement portion between the flange of the upper mold half flange (female mold in the embodiment shown) and the lower mold half flange (male mold in the embodiment shown). In the embodiments shown, the adjustment gap is determined using a single-channel interferometer by rotation 12 of the lens mold 1 about its optical axis 11.

Figure 5:
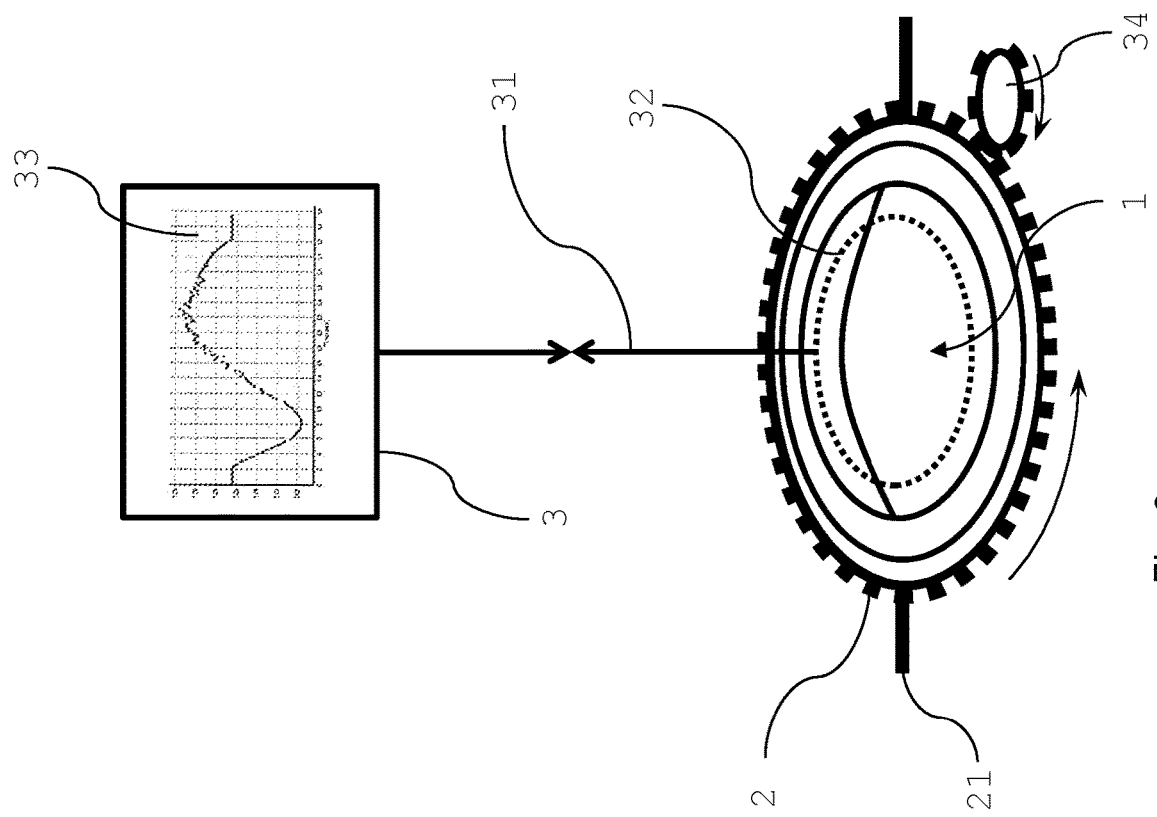
FIG. 5 shows a set-up for measuring a thickness profile of the molding cavity of the lens mold with a single-channel interferometer with a rotatable and tiltable lens mold holder.

FIG. 5 shows another schematic set-up for performing the method according to the invention comprising a lens mold holder 2 rotatably hold a lens mold and being configured to rotate the lens mold 1 about the optical axis 11 of the lens mold 1, the rotational axis coinciding with the optical axis being arranged substantially normal to a tangential plane to the lens molding surfaces at the apex 16 of the molding surfaces. In this case, substantially normal allows for a deviation of up to 5° from the normal to the tangential plane to the lens molding surfaces at the apex 16 of the molding surfaces. Preferably, the optical axis is arranged normal to a tangential plane to the lens molding surfaces at the apex 16 of the molding surfaces.

A tilted position of the lens mold 1 is obtained by a lens mold holder 2 configured to tilt the lens mold 1 about a tilting axis 21 normal to the thickness measurement beam 31 of the interferometer 3 impinging on the lens mold 1. The tilting direction is shown by the arrow in FIG. 5. The tiltable lens mold holder 2 allows for flexibly positioning the lens mold 1 for the thickness measurements by the interferometer 3, in particular for a measurement of the apex-to-apex cavity thickness or the adjustment gap thickness of engagement portions 14 of the lens mold 1 as discussed hereinbefore. The device further comprises an actuator 34 being configured to rotate the lens mold 1 relative to its optical axis 11.

Figure 6:
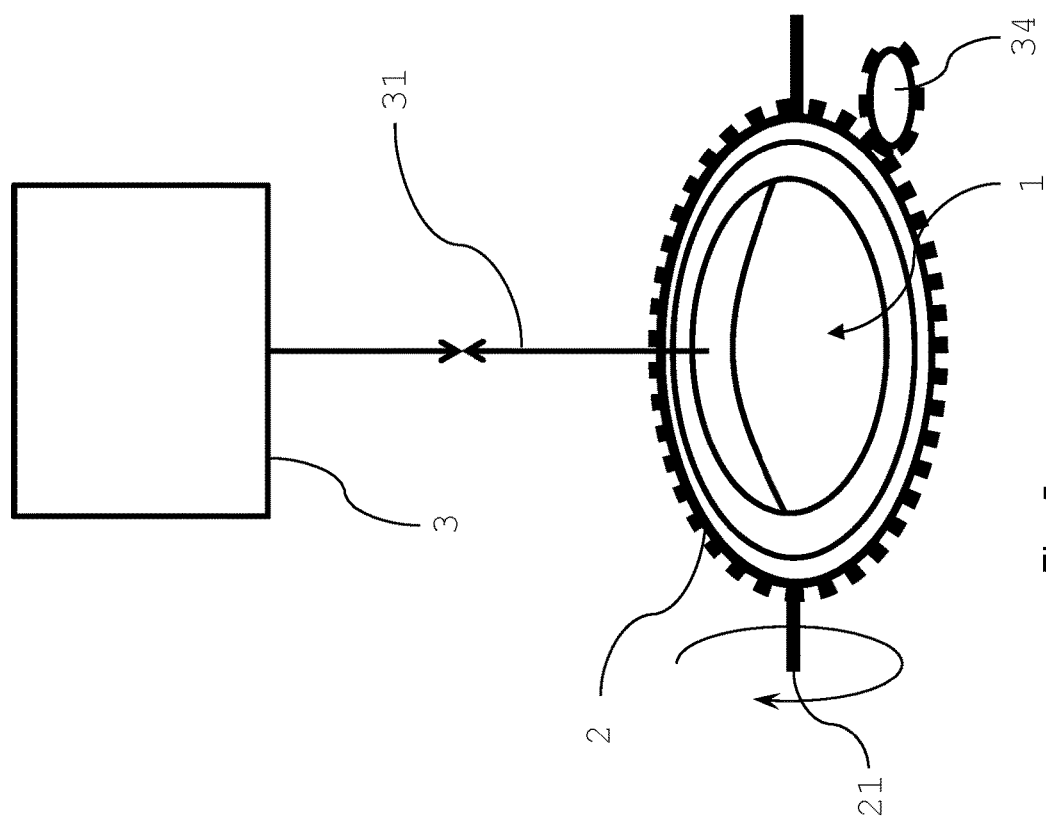
FIG. 6 shows a method for measuring a thickness profile of the molding cavity of the lens mold with a single-channel interferometer interferometer using a rotatable and tiltable lens mold holder.

As shown in FIG. 6, once the lens mold is brought into position for a thickness profile measurement, the tiltable lens mold holder 2 is maintained in the tilted position and the lens mold 1 is rotated about its optical axis 11 for the measurement of the thickness profile along a measurement circle 32. During the measurement, the thickness measurement beam 31 impinges onto the lens mold 1 along the measurement circle 32. The rotation directions of the lens mold 1 and of the actuator 34 are shown by the arrows in FIG. 6.

Figure 7:
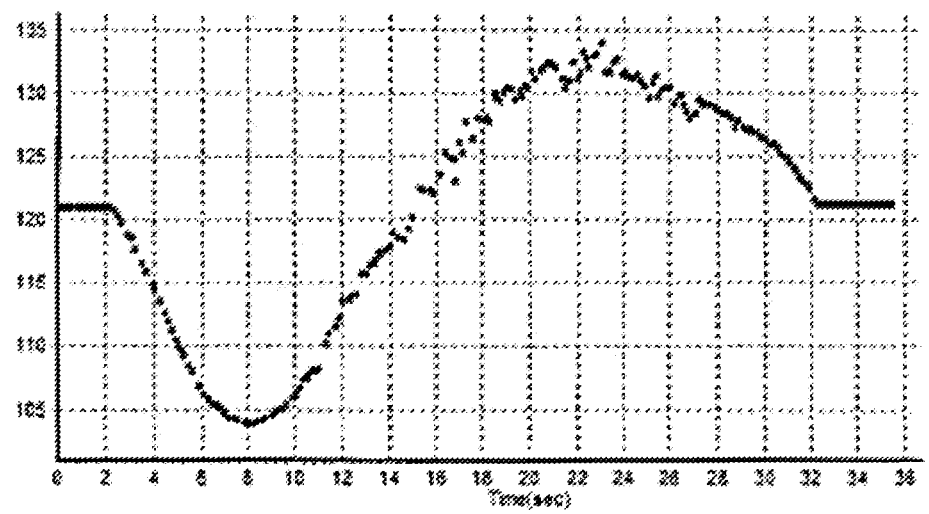
FIG. 7 is a representation of a thickness profile determined by the method according to FIG. 3.

A result of a thickness profile of an acceptable molding cavity is shown in FIG. 7. The thickness profile represented has high correlation with the expected thickness profile. This representation is provided by an electronic evaluation unit 33 adapted for determining from the interference fringes generated by the interferometer 3 the thickness profile of the molding cavity 15 from the distance between the two molding surfaces of the molding cavity 15. The electronic evaluation unit 33 may further be configured for comparing the measured thickness profile with a predetermined thickness profile to determine whether or not the lens mold 1 is acceptable. In particular, thickness profile may be correlated to a model of the expected thickness profile which corresponds to the expected geometry of the molding cavity 15. A threshold value for the correlation value of the measured thickness profile to the expected thickness profile may be used for the automated determination whether the lens mold 1 is acceptable or not.

Each dot in FIG. 7 represents a measurement value and the time scale is correlated to the rotation angle of the lens mold. The rotation starts at time 2 seconds (0° rotation) and a 360° rotation is accomplished at time 32 seconds. The higher the number of measurement points, the better the approximation of the thickness profile. In the development phase, it is advantageous to have a higher density of measurement points, whereas in an inline inspection, lower rate of measurement points may be acceptable. In the chart represented in FIG. 7, a rate of 5 measurement points per second was chosen.

Figure 8:
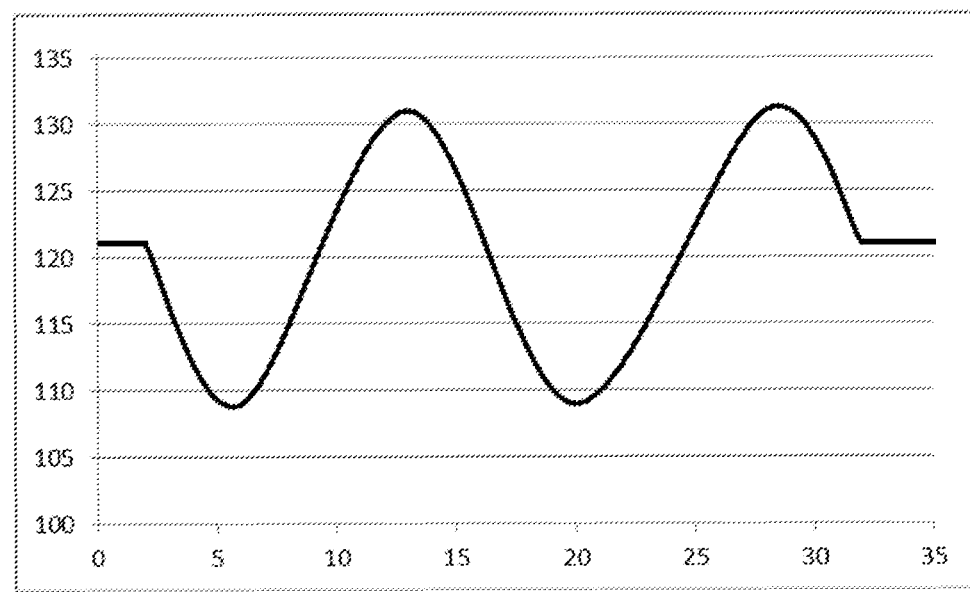
FIG. 8 shows a representation of a thickness profile of a defective lens mold determined by the method according to FIG. 3.

FIG. 8 shows a thickness profile of a defective lens mold. Strains in the closed the lens mold occurring during assembly of the two lens mold halves are responsible for the inappropriate thickness profile having the shape of a saddle and the lens mold will have to be discarded. In the case shown in FIG. 8, the thickness profile cannot be correlated to a model of the expected thickness profile which corresponds to the expected geometry of the molding cavity and the electronic evaluation unit will therefore not accept the lens mold. In case a correlation value of the measured thickness profile to the expected thickness profile model is determined, the correlation value will be below the threshold value and the automated evaluation will determine that the lens mold 1 is not acceptable.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

The invention claimed is:

1. A method for determining whether or not a single use mold is acceptable comprising:
   providing a closed lens mold (1) comprising two lens mold halves, and having a first and a second optical lens molding surface forming a molding cavity (15) and defining a molding cavity thickness therebetween,
   providing at least one multi-channel interferometer (3), each having at least one three thickness measurement beams (31),
   providing a lens mold holder (2) configured to hold a lens mold (1) in a manner such that the lens mold is rotatable about an optical axis (11) of the lens mold (1),
   positioning the lens mold (1) such that the thickness measurement beam (31) of the interferometer (3) impinges on the lens mold (1) at an angle of from 40° to 70°, with respect to an optical axis (11) of the lens mold (1) for measurement of the distance between the two molding surfaces surrounding the molding cavity (15),
   measuring the thickness profile of the molding cavity (15) with the interferometer (3) on at least three positions of the molding cavity (15) of the lens mold (1) wherein the at least three positions are arranged along at least one measurement circle (32) extending concentrically about an optical axis (11) of the lens mold (1) and wherein such measuring of the thickness profile of the molding cavity (15) is performed with the least three thickness measurement beams (31),
   comparing the measured thickness profile with a predetermined thickness profile to determine whether or not the lens mold is acceptable; wherein
   the mold halves of the lens mold (1) comprise engagement portions (14) radially surrounding the molding surfaces and having radially engaging walls, and
   wherein the method further comprises a step of measuring a radial adjustment gap between the radially engaging walls of the engagement portions (14) by impingement of the thickness measurement beam (31) on the radially engaging walls.

* * * * *